US008438009B2

(12) United States Patent
Amini et al.

(10) Patent No.: US 8,438,009 B2
(45) Date of Patent: May 7, 2013

(54) TEXT CATEGORIZATION BASED ON CO-CLASSIFICATION LEARNING FROM MULTILINGUAL CORPORA

(75) Inventors: Massih Amini, Gatineou (CA); Cyril Goutte, Toronto (CA)

(73) Assignee: National Research Council of Canada, Ottawa, Ontario (CA)

( * ) Notice: Subject to any disclaimer, the term of this patent is extended or adjusted under 35 U.S.C. 154(b) by 334 days.

(21) Appl. No.: 12/909,389

(22) Filed: Oct. 21, 2010

(65) Prior Publication Data

US 2011/0098999 A1 Apr. 28, 2011

Related U.S. Application Data

(60) Provisional application No. 61/254,009, filed on Oct. 22, 2009.

(51) Int. Cl.
*G06F 17/20* (2006.01)
*G06F 17/27* (2006.01)

(52) U.S. Cl.
USPC .................................................. 704/8; 704/9

(58) Field of Classification Search ........................ None
See application file for complete search history.

(56) References Cited

U.S. PATENT DOCUMENTS

| | | | | |
|---|---|---|---|---|
| 6,925,432 B2 * | 8/2005 | Lee et al. | ............................. | 704/5 |
| 7,016,829 B2 * | 3/2006 | Brill et al. | ........................... | 704/9 |
| 7,318,022 B2 * | 1/2008 | Li | .................................. | 704/10 |
| 7,363,212 B2 * | 4/2008 | Erhart et al. | ....................... | 704/2 |
| 7,409,336 B2 * | 8/2008 | Pak et al. | ............................ | 704/9 |
| 7,440,944 B2 | 10/2008 | Selvaraj et al. | | |
| 7,467,079 B2 * | 12/2008 | Morimoto et al. | ................. | 704/9 |
| 7,480,667 B2 | 1/2009 | Harr et al. | | |
| 7,752,159 B2 * | 7/2010 | Nelken et al. | .................... | 706/62 |
| 7,945,437 B2 * | 5/2011 | Mount et al. | ........................ | 704/4 |
| 8,275,604 B2 * | 9/2012 | Jiang et al. | .......................... | 704/4 |
| 2004/0122660 A1 * | 6/2004 | Cheng et al. | ..................... | 704/10 |
| 2006/0218134 A1 | 9/2006 | Simske et al. | | |
| 2007/0005337 A1 | 1/2007 | Mount et al. | | |
| 2007/0156615 A1 | 7/2007 | Davar et al. | | |
| 2008/0262826 A1 | 10/2008 | Pacull | | |
| 2010/0106704 A1 * | 4/2010 | Josifovski et al. | ............ | 707/708 |
| 2010/0324883 A1 * | 12/2010 | Platt et al. | ......................... | 704/2 |

OTHER PUBLICATIONS

Wan, "Co-Training for Cross-Lingual Sentiment Classification", Proceedings of the 47th Annual Meeting of the ACL and the 4th IJCNLP of the AFNLP, pp. 235-243, Suntec, Singapore, Aug. 2-7, 2009.*

(Continued)

*Primary Examiner* — Brian Albertalli
(74) *Attorney, Agent, or Firm* — Benoî & Côté

(57) ABSTRACT

The present document describes a method and a system for generating classifiers from multilingual corpora including subsets of content-equivalent documents written in different languages. When the documents are translations of each other, their classifications must be substantially the same. Embodiments of the invention utilize this similarity in order to enhance the accuracy of the classification in one language based on the classification results in the other language, and vice versa. A system in accordance with the present embodiments implements a method which comprises generating a first classifier from a first subset of the corpora in a first language; generating a second classifier from a second subset of the corpora in a second language; and re-training each of the classifiers on its respective subset based on the classification results of the other classifier, until a training cost between the classification results produced by subsequent iterations reaches a local minima.

26 Claims, 12 Drawing Sheets

OTHER PUBLICATIONS

Adeva et al., "Multilingual Approaches to Text Categorisation", The European Journal for the Informatics Professional, vol. 6, pp. 43-51, 2005.*

Rigutini et al., "An EM based training algorithm for Cross-Language Text Categorization", Proceedings of the 2005 IEEE/WIC/ACM International Conference on Web Intelligence, Compiegne, France, Sep. 2005.*

Li et al., "Advanced Learning Algorithms for Cross-Language Patent Retrieval and Classification", Information Processing & Management vol. 43, Issue 5, pp. 1183-1199, Sep. 2007.*

Blum et al., "Combining Labeled and Unlabeled Data with Co-Training", Proceedings of the Eleventh Annual conference on Computational Learning Theory, p. 92-100, 1998.

Brefeld et al., "Efficient Co-Regularised Least Squares Regression", ICML 06, Proceedings of the 23rd international conference on Machine learning, New York, 8 pages, 2006.

Collins et al., "Logistic Regression, AdaBoost and Bregman Distances", Machine Learning, 48, pp. 253-285, 2002.

Joachims, "Transductive Inference for Text Classification using Support Vector Machines", Dortmund University, Germany, ICML-99, Proceedings of the Sixteenth International Conference on Machine Learning, 10 pages, 1999.

Robertson et al., "Okapi at TREC-3", Centre for Interactive Systems Research, Dept. of Information Science, City University, London, UK, 19 pages, 1995.

Li et al: "Advanced learning algorithms for cross-language patent retrieval and classification", Information Processing & Management, Elsevier, Barking, GB, vol. 43, No. 5, Apr. 27, 2007, pp. 1183-1199.

Rigutini L et al: "An EM Based Training Algorithm for Cross-Language Text Categorization", Web Intelligence, 2005. Proceedings. The 2005 IEEE/WIC/ACM International conference on Compiegne, France, Sep. 19-22, 2005, Piscataway, NJ, USA,IEEE, (Sep. 19, 2005), pp. 529-535.

* cited by examiner

Algorithm 1: The co-classification algorithm

Input : Two labeled sets $S_1$ and $S_2$;
A discount factor $\lambda$.
Initialize: $t \leftarrow 1$;
$h_1^{(0)} \stackrel{def}{=} \text{argmin}_h \, C(h, S_1)$;
$h_2^{(0)} \stackrel{def}{=} \text{argmin}_h \, C(h, S_2)$;
repeat
  Learn $h_1^{(t)} = \text{argmin}_h \, \mathcal{L}(h, S_1, h_2^{(t-1)}, S_2, \lambda)$;
  Learn $h_2^{(t)} = \text{argmin}_h \, \mathcal{L}(h, S_2, h_1^{(t)}, S_1, \lambda)$;
  $t \leftarrow t + 1$;
until *Convergence of* $\Delta(h_1^{(t)}, S_1, h_2^{(t)}, S_2, \lambda)$ *(eq. 4) to a local minimum*;
Output : $f_1 = \text{sign}(h_1^{(t)})$ and $f_2 = \text{sign}(h_2^{(t)})$

FIGURE 6

Algorithm 2: The parallel-update optimization algorithm

Input : Matrix $M \in [-1, 1]^{n \times d}$
Initialize: Let $\beta = 0$
for $t = 1, 2, \ldots$ do
    Let $q_t$ be the solution of $L_F(q_0, M\beta_t)$;
    for $j = 1, \ldots, d$ do
        $W_{t,j}^+ = \sum_{i:sign(M_{i,j})=+1} q_{t,i}|M_{i,j}|$;
        $W_{t,j}^- = \sum_{i:sign(M_{i,j})=-1} q_{t,i}|M_{i,j}|$;
        $\delta_{t,j} = \frac{1}{2} \log\left(\frac{W_{t,j}^+}{W_{t,j}^-}\right)$;
    end
    $\beta_{t+1} = \beta_t + \delta_t$;
end
Output : The sequence $\beta_1, \beta_2, \ldots$ verifying $$\lim_{t \to \infty} B_F(0 \| L_F(q_0, M\beta_t)) = \inf_{\beta \in \mathbb{R}^d} B_F(0 \| L_F(q_0, M\beta_t))$$

FIGURE 7

| | Class proportions (%) | | | | | # docs | Voc. size |
|---|---|---|---|---|---|---|---|
| | C15 | CCAT | E21 | ECAT | GCAT | M11 | | |
| French | 18.7 | 18.7 | 8.3 | 18.7 | 18.7 | 16.6 | 26,648 | 24,893 |
| German | 16.7 | 16.7 | 16.7 | 16.7 | 16.7 | 16.6 | 29,953 | 34,279 |
| Italian | 12.4 | 20.8 | 18.5 | 20.8 | 11.8 | 15.6 | 24,039 | 15,506 |
| Spanish | 5.9 | 17.0 | 6.7 | 17.5 | 12.2 | 40.5 | 12,342 | 11,547 |

FIGURE 8

|  |  | C15 | CCAT | E21 | ECAT | GCAT | M11 |
|---|---|---|---|---|---|---|---|
| French | logistic | 0.837 | 0.685[↓] | 0.672[↓] | 0.703[↓] | 0.815[↓] | 0.947 |
|  | SVM$_{light}$ | 0.828[↓] | 0.687[↓] | 0.664[↓] | 0.702[↓] | 0.817[↓] | 0.940[↓] |
|  | cc-Logistic | 0.841 | 0.712 | 0.688 | 0.715 | 0.824 | 0.952 |
|  | cc-Boost | 0.843 | 0.709 | 0.691 | 0.712 | 0.828 | 0.948 |
| English$_f$ | logistic | 0.799[↓] | 0.667[↓] | 0.642[↓] | 0.666[↓] | 0.779[↓] | 0.933[↓] |
|  | SVM$_{light}$ | 0.825 | 0.665[↓] | 0.651[↓] | 0.642[↓] | 0.812 | 0.941[↓] |
|  | cc-Logistic | 0.821 | 0.694 | 0.668 | 0.691 | 0.817 | 0.955 |
|  | cc-Boost | 0.824 | 0.691 | 0.671 | 0.694 | 0.820 | 0.951 |
| German | logistic | 0.788[↓] | 0.641[↓] | 0.752[↓] | 0.653[↓] | 0.758[↓] | 0.899 |
|  | SVM$_{light}$ | 0.775[↓] | 0.645[↓] | 0.748[↓] | 0.655[↓] | 0.742[↓] | 0.903 |
|  | cc-Logistic | 0.808 | 0.687 | 0.776 | 0.682 | 0.778 | 0.912 |
|  | cc-Boost | 0.812 | 0.684 | 0.772 | 0.679 | 0.775 | 0.908 |
| English$_g$ | logistic | 0.736[↓] | 0.610[↓] | 0.725[↓] | 0.612[↓] | 0.735[↓] | 0.876[↓] |
|  | SVM$_{light}$ | 0.751[↓] | 0.623[↓] | 0.714[↓] | 0.623[↓] | 0.757[↓] | 0.881[↓] |
|  | cc-Logistic | 0.774 | 0.645 | 0.768 | 0.664 | 0.769 | 0.897 |
|  | cc-Boost | 0.777 | 0.640 | 0.772 | 0.659 | 0.771 | 0.894 |
| Italian | logistic | 0.721[↓] | 0.722[↓] | 0.789[↓] | 0.787[↓] | 0.616[↓] | 0.929[↓] |
|  | SVM$_{light}$ | 0.719[↓] | 0.724[↓] | 0.793[↓] | 0.782[↓] | 0.620[↓] | 0.943 |
|  | cc-Logistic | 0.740 | 0.756 | 0.809 | 0.809 | 0.633 | 0.945 |
|  | cc-Boost | 0.736 | 0.759 | 0.813 | 0.810 | 0.629 | 0.948 |
| English$_i$ | logistic | 0.658[↓] | 0.656[↓] | 0.751[↓] | 0.735[↓] | 0.575[↓] | 0.899[↓] |
|  | SVM$_{light}$ | 0.661[↓] | 0.654[↓] | 0.738[↓] | 0.773 | 0.583[↓] | 0.920 |
|  | cc-Logistic | 0.689 | 0.694 | 0.791 | 0.768 | 0.610 | 0.909 |
|  | cc-Boost | 0.691 | 0.692 | 0.787 | 0.766 | 0.607 | 0.913 |
| Spanish | logistic | 0.608[↓] | 0.809[↓] | 0.603[↓] | 0.732[↓] | 0.821[↓] | 0.899 |
|  | SVM$_{light}$ | 0.702[↓] | 0.804[↓] | 0.608[↓] | 0.729[↓] | 0.829[↓] | 0.907 |
|  | cc-Logistic | 0.712 | 0.825 | 0.744 | 0.769 | 0.847 | 0.905 |
|  | cc-Boost | 0.716 | 0.821 | 0.741 | 0.771 | 0.843 | 0.908 |
| English$_s$ | logistic | 0.676[↓] | 0.762[↓] | 0.563[↓] | 0.699[↓] | 0.829[↓] | 0.878[↓] |
|  | SVM$_{light}$ | 0.681[↓] | 0.782[↓] | 0.558[↓] | 0.725[↓] | 0.831[↓] | 0.908 |
|  | cc-Logistic | 0.697 | 0.804 | 0.602 | 0.759 | 0.844 | 0.899 |
|  | cc-Boost | 0.701 | 0.808 | 0.598 | 0.762 | 0.841 | 0.902 |

FIGURE 9

TEXT CATEGORIZATION BASED ON CO-CLASSIFICATION LEARNING FROM MULTILINGUAL CORPORA

CROSS-REFERENCE TO RELATED APPLICATIONS

This application claims priority from U.S. Provisional Application No. 61/254,009 filed on Oct. 22, 2009 which is incorporated herein by reference in its entirety.

TECHNICAL FIELD

The present description relates to the field of text categorization, and more particularly, to multilingual data categorization and classifiers.

BACKGROUND

Text categorization addresses the general purpose of organizing electronic information by filing documents according to an existing structure (taxonomy) and filter relevant/irrelevant information, whereby simply browsing of categories can be performed to search for documents.

In many contexts, people are confronted with documents available in more than one language. This is a typical situation in many multilingual regions of the world, including many regions of Europe and, for example, most legal and regulatory documents in Canada. However, document categorization models are mostly developed in a monolingual context, typically from a resource-rich language such as English.

Currently, when a data categorization is needed for documents which are available in two (or more) languages and share the same set of categories, the available techniques train monolingual categorizers on each part of the corpus independently. This approach ignores the potentially richer information available from the other language, and produces widely different results on the different parts of the corpus. Furthermore, this approach is impractical when the number of available documents in the different languages is uneven.

In multiview learning for text categorization, there are two important classes of known techniques: the multiple kernel learning approach, and techniques relying on (kernel) Canonical Correlation Analysis (CCA). Multiple kernel learning typically assumes that all views of an example are available during training and testing, for example the same object viewed from different angles in object recognition. CCA identifies matching maximally-correlated subspaces in the two views that may be used to project data before learning is performed, or integrated with learning. Other multiview learning techniques also exist, but concerns arise due to computational complexity and scalability to large document collections.

None of the prior art techniques makes use of the classification information available from one language to improve the classification of another language.

There is thus a need for a system and method which is able to leverage the multilingual data provided in the different languages of the corpus in order to produce a text classification with an accuracy that is higher than what one may obtain from an independent monolingual categorizer typical of prior art methods where different language versions of the same document are categorized separately in an independent manner.

SUMMARY

The present description addresses prior art shortcomings, and more particularly, the problem of boosting the performance of multiple monolingual document categorizers by using a corpus of multilingual documents.

The present system and method seek to provide improved document classification by producing enhanced monolingual categorizers in each of the different languages (referred herein simply as categorizers), to predict categories directly from a monolingual document. In the system and method proposed herein, statistical categorizers are learned by optimizing a joint loss with an additional constraint on the divergence between the outputs produced on the different languages. The classification loss is minimized for both classifiers under the constraint that their outputs are as similar as possible on documents and their translations. It is shown herein that this produces an increase in performance over independent categorizers trained on monolingual data, and over bilingual categorizers trained on the concatenated views. The overall goal is to obtain a number of categorizers that each work on monolingual data and repeat the work in view of the output of the other categorizers to produce equivalent categorization results.

In a first aspect, there is provided a method for enhancing a performance of a first classifier used for classifying a first subset of documents written in a first language, the method comprising: a) providing a second subset of documents written in a second language different than the first language, said second subset including substantially the same content as the first subset; b) running the first classifier over the first subset to generate a first classification; c) running a second classifier over the second subset to generate a second classification; d) reducing a training cost between the first and second classifications, said reducing comprises repeating steps b) and c) wherein each classifier updates its own classification in view of the classification generated by the other classifier until the training cost is set to a minimum; and e) outputting at least one of said first classification and said first classifier.

In an embodiment, reducing may further comprise updating one classification based on a probability associated with each class in the other classification. In another embodiment, updating may comprise reducing classification errors.

In a further embodiment, the training cost includes a misclassification cost associated with each classifier and a disagreement cost between the two classifiers.

In one embodiment reducing comprises adjusting parameters of each classifier to reduce the training cost between classifications.

In one embodiment reducing comprises applying a gradient based algorithm for reducing the training cost between classifications. In another embodiment, reducing comprises applying an analytical algorithm for finding an approximate solution that reduces classification losses to reduce the training cost between classifications.

In a further embodiment, each classifier updates its own classification in view of the latest version of updated classification generated by the other classifier.

In one embodiment, repeating is performed at least partially in parallel by the first and second classifiers. In another embodiment, repeating is performed in series wherein one classifier is fixed and the other classifier updates its own classification using the classification of the fixed classifier.

In one embodiment, providing the second subset comprises machine-translating said first subset into the second language. In a second embodiment, providing the second subset comprises providing a subset which is comparable to the first subset. In a third embodiment, providing the second subset comprises providing a subset which is a parallel translation of the first subset.

In a further embodiment, the minimum is determined on the basis of a level of difference between the first and second languages.

In a second aspect, there is provided a method for generating classifiers from multilingual corpora, the method comprising:

extracting textual data from each one of a set of documents which form part of the multilingual corpora, the multilingual corpora comprising a first and a second subset of content-equivalent documents written in one of two respective languages;

transforming the textual data into a respective one of feature vectors x1 and x2, each one of the feature vectors being associated to a document classification y for categorizing different language versions of a same document;

generating a first classifier f1 from the first subset, the first classifier f1 being associated to the feature vector x1;

generating a second classifier f2 from the second subset, the second classifier f2 being associated to the feature vector x2;

re-training the first classifier f1 on the first subset based on classification results obtained from the second classifier f2, to obtain a re-trained first classifier f1';

re-training the second classifier f2 on the second subset based on other classification results obtained from the re-trained first classifier f1', to obtain a re-trained second classifier f2'; and repeating the steps of re-training until a training cost between the re-trained first and second classifiers is minimized, thereby producing final first and second re-trained classifiers; and outputting the final first and second re-trained classifiers.

In a third aspect, there is provided a computer readable memory having recorded thereon statements and instructions for execution by a processor for implementing the method of the first aspect.

In a fourth aspect, there is provided a computer readable memory having recorded thereon statements and instructions for execution by a processor for implementing the method of the second aspect.

In a third aspect, there is provided a system for classifying content-equivalent documents written in different languages, said system comprising a first classifier for classifying a first set of documents written in a first language to generate a first classification;

a second classifier for classifying a second set of documents written in a second language different the first language to generate a second classification;

a comparator operatively connected to outputs of said first and second classifiers for detecting a training cost between said first and second classifications; and an optimizer for adjusting parameters of said first and second classifiers based on the second and first classifications respectively, when the training cost is higher than a minimum.

The optimizer orders the first and second classifiers to re-classify the first and second sets of documents until the training cost reaches the minimum.

In one embodiment, each classifier updates its own classification based on a probability associated with each class in the other classification.

In another embodiment, one of the first and second sets is a machine-translation of the other.

In a further embodiment, the system comprises a translator for translating one of the sets to a different language.

In yet another embodiment, the minimum is determined on the basis of a level of difference between the first and second languages.

In accordance with an embodiment, there is provided a method for generating classifiers from multilingual corpora. The method comprises: extracting textual data from each one of a set of documents which form part of the multilingual corpora, the multilingual corpora comprising a first and a second subset of content-equivalent documents written in one of two respective languages; transforming the textual data into a respective one of feature vectors x1 and x2, each one of the feature vectors being associated to a document classification y for categorizing different language versions of a same document; generating a first classifier f1 from the first subset, the first classifier f1 being associated to the feature vector x1; generating a second classifier f2 from the second subset, the second classifier f2 being associated to the feature vector x2; and minimizing a disagreement between classifiers f1 and f2 under a constraint, to produce final classifiers f1' and f2', the constraint being relative to a similarity between classification results respectively associated with each one of the final classifiers f1' and f2"; wherein the classification results of the final classifiers f1' and f2' comprise the classification of two content-equivalent documents having the textual data according to the document classification y, the two content-equivalent documents being respectively from the first and the second subset.

In accordance with another embodiment, there is provided a method for generating classifiers from multilingual corpora. The method comprises: extracting textual data from each one of a set of documents which form part of the multilingual corpora, the multilingual corpora comprising a first and a second subset of content-equivalent documents written in one of two respective languages; transforming the textual data into a respective one of feature vectors x1 and x2, each one of the feature vectors being associated to a document classification y for categorizing different language versions of a same document; generating a first classifier f1 from the first subset, the first classifier f1 being associated to the feature vector x1; generating a second classifier f2 from the second subset, the second classifier f2 being associated to the feature vector x2; re-training the first classifier f1 on the first subset based on classification results obtained from the second classifier f2, to obtain a re-trained first classifier f1'; re-training the second classifier f2 on the second subset based on other classification results obtained from the re-trained first classifier f1', to obtain a re-trained second classifier f2'; and once a first disagreement and a second disagreement is minimized, outputting the first and the second re-trained classifiers f1' and f2' as final output classifiers usable to classify a document having the textual data corresponding to any one of the feature vectors x1 and x2, into classification y, wherein the first disagreement is between classification results obtained from the re-trained classifier f2' of a previous re-training iteration and classification results obtained from the re-trained first classifier f1' of a current first classifier training iteration, and the second disagreement is between the classification results obtained from the re-trained first classifier f1' of a previous re-training iteration, and classification results obtained from the re-trained second classifier f2' of a current second classifier training iteration.

In one embodiment, at least one of the re-training the first classifier and the re-training the second classifier as in the above method, comprises one of: using a gradient-based logistic regression and a boosting-based approach as described herein below.

In accordance with yet another embodiment, there is provided a method for classifying documents in accordance with classifiers which are generated from multilingual corpora in accordance with the above. In one example, the above method comprises classifying a set of documents according to the document classification y, using the final output classifiers, wherein at least one the set of documents comprises the textual data.

In accordance with an embodiment, there is herein described a system implemented to perform the tasks of the above method.

BRIEF DESCRIPTION OF THE DRAWINGS

Further features and advantages of the present disclosure will become apparent from the following detailed description, taken in combination with the appended drawings, in which:

FIG. 6 represents steps of a Co-classification, Gradient-Based training approach (Algorithm 1) in accordance with an embodiment;

FIG. 7 represents steps of a Boosting-based training approach (Algorithm 2) in accordance with an embodiment;

FIG. 8 is a table showing a distribution of the number of documents and size of the vocabulary of the Reuters RCV2 data used in experiments, across languages and categories;

FIG. 9 is a table listing the F-measures of different learning algorithms on different classes and for all languages, obtained from the experimental data summarized in FIG. 8;

It will be noted that throughout the appended drawings, like features are identified by like reference numerals.

DETAILED DESCRIPTION

In the following detailed description of exemplary embodiments of the invention, reference is made to the accompanying drawings in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Hardware and Operating Environment

Figure 1:
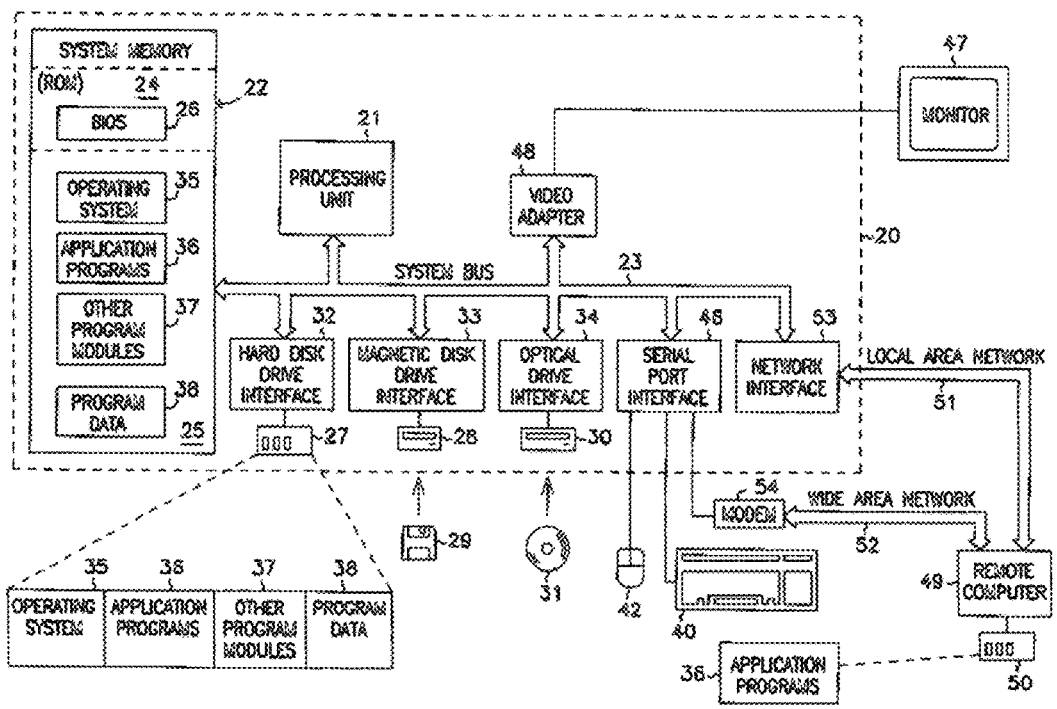
FIG. 1 illustrates a diagram of the hardware and operating environment in conjunction with which the present embodiments may be practiced.

FIG. 1 illustrates a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer, a hand-held or palm-size computer, or an embedded system such as a computer in a consumer device or specialized industrial controller. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. In one embodiment of the invention, the computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In alternative embodiments of the invention, the functionality provided by the hard disk drive 27, magnetic disk 29 and optical disk drive 30 is emulated using volatile or non-volatile RAM in order to conserve power and reduce the size of the system. In these alternative embodiments, the RAM may be fixed in the computer system, or it may be a removable RAM device, such as a Compact Flash memory card.

In an embodiment of the invention, the hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide non-volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 2S, including an operating system 3S, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, touch sensitive pad, or the like. These and other input devices are often connected to the processing unit 21 through a serial port interface 46 that is coupled to the system bus, but may be connected by other interfaces, such as a parallel port, game port, or a universal serial bus (USB). In addition, input to the system may be provided by a microphone to receive audio input.

A monitor 47 or other type of display device is also connected to the system bus 23 via an interface, such as a video adapter 48. In one embodiment of the invention, the monitor comprises a Liquid Crystal Display (LCD). In addition to the monitor, computers typically include other peripheral output devices (not shown), such as speakers and printers.

The computer 20 may operate in a networked environment using logical connections to one or more remote computers, such as a remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer an hand-held or palm-size computer, a computer in an embedded system, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

General Concept

The present document describes a method and a system for generating classifiers from multilingual corpora including subsets of content-equivalent documents written in different languages. When the documents are translations of each other, their classifications must be substantially the same. Embodiments of the invention utilize this similarity in order to enhance the accuracy of the classification in one language based on the classification results in the other language, and vice versa. A system in accordance with the present embodiments implements a method which comprises generating a first classifier from a first subset of the corpora in a first language; generating a second classifier from a second subset of the corpora in a second language; and re-training each of the classifiers on its respective subset based on the classification results of the other classifier, until a training cost between the classification results produced by subsequent iterations reaches a local minima.

In this document, the term "training cost" should be understood as the combination of:
1) a monolingual misclassification cost for each classifier in each language/view; and
2) a disagreement cost between the classifiers.

Figure 10:
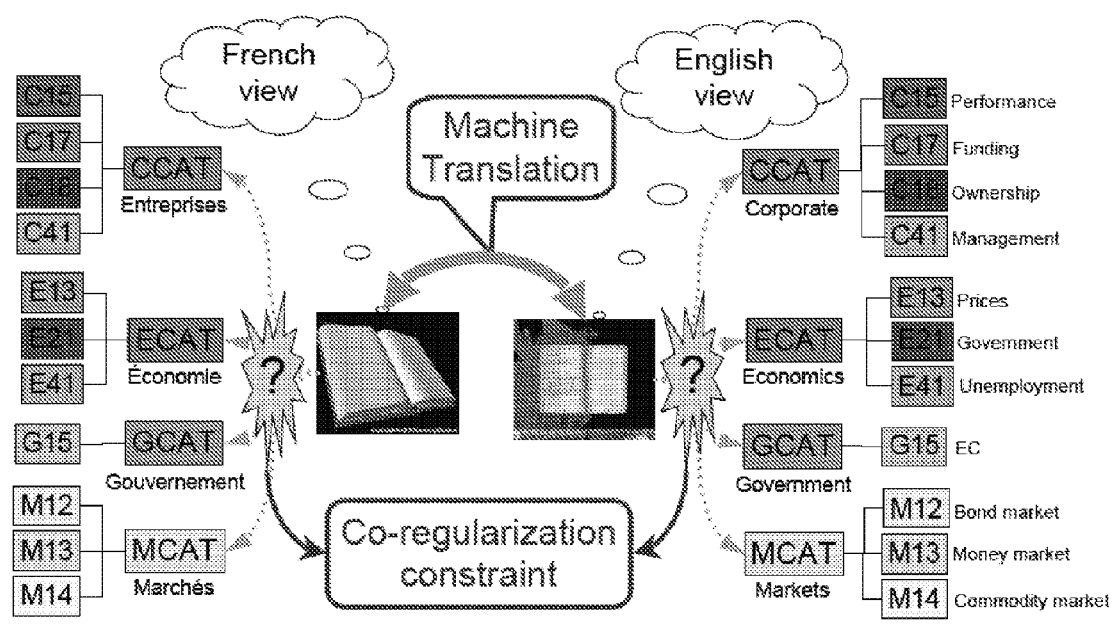
FIG. 10 is a schematic illustration of a document classification hierarchy built in accordance with an embodiment of a so-classification learning technique.

All languages use substantially the same classes for classifying/categorizing documents. For example, a sport document in English and its translation in French may be categorized as "sport" in both languages. Regardless of the differences between the languages, each class in one language must have a corresponding class in the other language. Therefore, when documents are translations of each other, their classifications must be substantially the same. Examples of categories include: religion, justice, sport, economy, politics, environment, unemployment, etc. It is also possible to have sub-categories (aka sub-classes) within each category (aka class) as shown in FIG. 10.

Embodiments of the invention utilise this similarity in order to enhance the accuracy of the classification in one language based on the classification results in the other language. This way each classifier may benefit from the output of the other classifier to enhance its own output. Embodiments of the invention are practiced on multilingual corpora including subsets of content-equivalent documents written in different languages. The documents forming each subset must include labelled data. If the documents are translated to another language the same labels may be used in the translation.

The inventors of the present application propose a multiview learning, co-regularization approach, in which they consider each language as a separate source, and minimize a joint loss that combines monolingual classification losses in each language while ensuring consistency of the categorization across languages. The inventors derive training algorithms for logistic regression and boosting, and show that the resulting categorizers outperform models trained independently on each language. Experiments were carried out on a multilingual extension of the Reuters collection (referred to as RCV2) corpus. Once the classifiers are trained, each classifier may be used to classify any document/subset of documents in that language without having to repeat the learning steps e.g. without needing to compare the results with another classifier to adjust the results.

Accordingly, the embodiments discussed herein describe a system and method for enhancing the accuracy and performance of data classifiers. The process is performed on multilingual corpora including content-equivalent documents written in different languages. For example, the set of multilingual documents may include two or more subsets of documents, each subset being written in a different language and including substantially the same content as the other subset(s) such as when the documents are translations of each other. In an embodiment, a first classifier generates a first classification for a first subset of documents written in a first language. A second classifier generates a second classification for a second subset of documents written in a second language different than the first language. The first and second subsets include content-equivalent documents. For example, one subset may be a translation of the other. After the two classifications are done, one of the classifiers is re-run on the basis of the output of the other classifier. For example, the first classifier may be run again on the first subset to update the first classification in view of the second classification for minimizing its classification errors and reducing its disagreement with the second classifier.

Consider a scenario where the second classifier has classified some document X2 from the second subset (thus, in the second language) in a given classification with a high degree of certainty (with a high probability), while the corresponding document X1 in the first subset (in the first language) has been misclassified or has been classified with low probability by the first classifier. When the two classifiers finish their first round of classification, and output the classification results in the memory, the first classifier may be run again over the first subset to update the first classification in view of the classification results of the second classifier. In this case, the first classifier performs a new iteration of classification over the first subset to update the first classification in view of the second classification and the probability associated with each class. Referring back to the above scenario, when the first classifier finds that the document X1 in the first language has been misclassified in the first classification while the corresponding document X2 in the second language has a high probability in the second classification (i.e. when the second classifier is certain that X2 should be assigned to the designated class), the first classifier would correct its results to assign the document X1 to the same or a corresponding class as the class of X2. This is only one example of how a classification in one language may be used to improve the classification in the other language.

In an embodiment, after the first classifier performs its second iteration and stores the updated first classification in memory, the second classifier performs a second iteration to update the second classification in view of the updated first classification. The difference between the two classifications is reduced after each iteration as well as the classification errors associated with classifier until the training cost reaches a minimum. Several iterations may be performed by each classifier until the training cost between the two classifications reaches the minimum.

Figure 2:
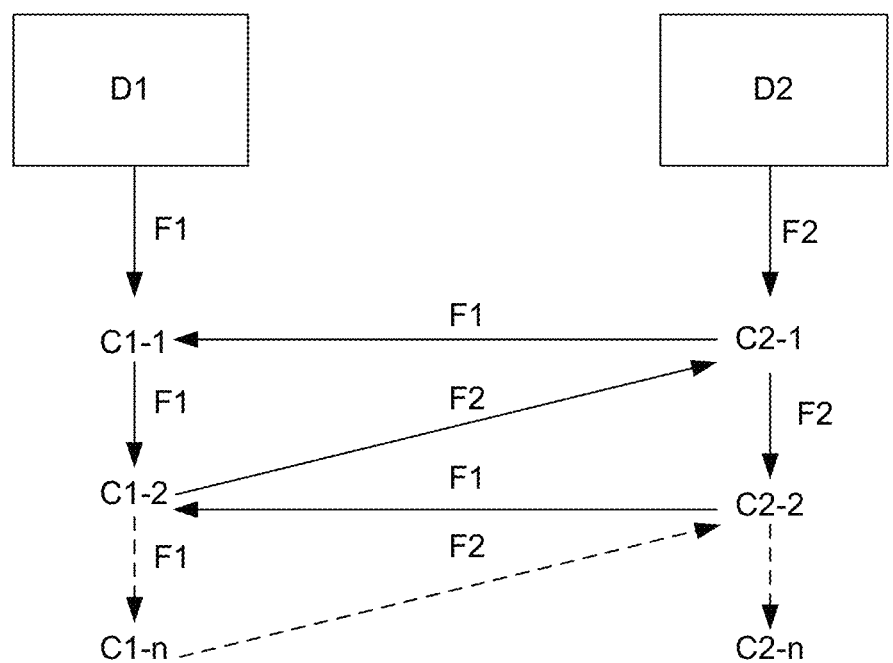
FIG. 2 illustrates an example of the multi-view learning process in accordance with an embodiment.

This example will be described in further detail with reference to FIG. 2 which illustrates an example of the multi-view learning process in accordance with an embodiment. As shown in FIG. 2, two subsets of documents D1 and D2 are provided. The subsets are in different languages and include content-equivalent documents.

Referring back to FIG. 2, the classifiers F1 and F2 classify the subsets D1 and D2 to create a first classification C1-1 and a second classification C2-1 in the first round of classification, respectively. When the first round of classification (first iteration) is done on both subsets, one of the classifiers is fixed and the other is re-run over the same document to update its own classification in view of the classification result of the fixed classifier. For example, the second classifier may be fixed while the first classifier F1 may begin a second round of classification on the first subset to update the first classification C1-1 in view of the classification results C2-1. The classifier F1 produces an updated version C1-2 after the second iteration. Similarly, the updated first classification C1-2 is fixed, while the second classifier F2 may use the updated fixed classification C1-2 to update its own classification C2-1 to generate and store an updated second classification C2-2. The process is repeated until the nth iteration when the training cost between the two classifications reaches a minimum.

FIG. 2 illustrates the iterations as being performed in series one classifier after the other. However, it should be noted that the design is not limited to this implementation. It is also possible to implement these steps in parallel as shown in FIG. 3.

Figure 3:
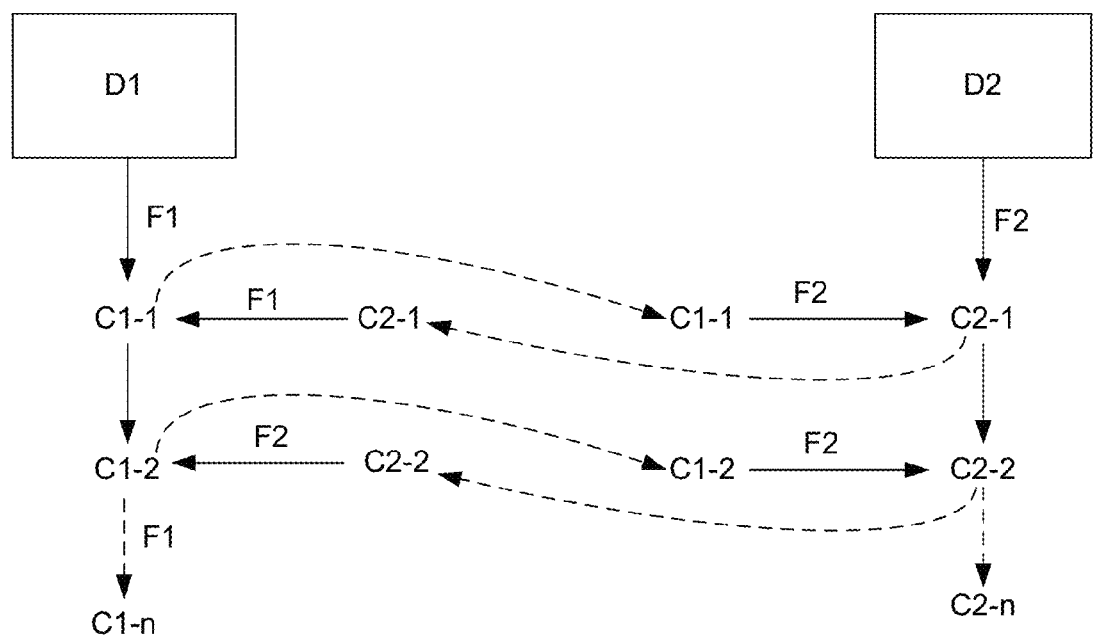
FIG. 3 illustrates an example of the multi-view learning process in accordance with another embodiment.

FIG. 3, illustrates another example of the multi-view learning process in accordance with an embodiment. As shown in FIG. 3, two subsets of documents D1 and D2 are provided. The subsets are in different languages and include content-equivalent documents. Classifiers F1 and F2 classify the subsets D1 and D2 to create a first classification C1-1 and a second classification C2-1 in the first round of classification, respectively. The classifications C1-1 and C2-1 are stored in memory. A duplicate of each classification is stored in a temporary folder in memory for comparison with the classification performed by the other classifier. For example, the first classifier F1 may use the duplicate of the second classification C2-1 to generate an updated first classification C1-2. The second classifier F2 may simultaneously, be using the duplicate of the first classification C1-1 to generate an updated second classification C2-2. This way, the two classifiers may work in parallel to each other, in contrast to what is shown in FIG. 2. Updated classifications C1-2 and C2-2 replace C1-1 and C2-1, and the duplicates thereof in memory. The same steps are repeated until the nth iteration when the training cost between C1-$n$ and C2-$n$ (or n+1 or n−1) reaches a minimum.

The minimum may be calculated on the basis of the difference between the two languages. For example, the minimum may be based on the classification loss of both classifiers and their disagreement. In an embodiment, the minimum may be determined during the optimization process while the classifiers repeat/update their classifications. In one embodiment, the processor may decide to terminate the iterations when the classifications do not converge any further. For example, if the training cost at the $n^{th}$ iteration is the same as what it was at the $(n-1)^{th}$ iteration, the processor may decide to terminate the process if no further improvement is accomplished by the subsequent iterations.

It should be noted that the subsets of documents do not have to be parallel (exact) translations of each other but must include sufficient information in common to make them comparable with each other. Furthermore, when classification is needed for one subset of documents, and a translation of that document does not exist, it is possible to use a machine translation, to create a corresponding subset which includes content-equivalent documents in a different language for the sake of benefitting from the rich information available from the other language in order to improve the accuracy of the classification. Accordingly, a translator (not shown) may be used to provide a translation when the translation is not initially provided. The translator is optional and may not be needed/used when the subsets are already provided in different languages such as in a multilingual corpora including subsets of content-equivalent documents.

It should be noted that the design is not only limited to the correction of errors. The entire behaviour of the classifier is subject to adjustment and modification based on the rich information provided from the other language. In an embodiment, parameters of each classifier are adjusted at each iteration, in order to more accurately classify the associated documents to reduce the training cost between the outputs of the different classifiers. Several algorithms may be used to reduce the training cost between the different classifications. Some of these algorithms may be adopted to minimise the cost function associated with the outputs of the classifiers in order to reduce the training cost between the outputs. Examples of these algorithms include the co-classification training approach and the boosting based approach which will be described in detail herein below.

The co-classification algorithm is related to what is known as co-regularization. One key difference, however, is that instead of regularizing the disagreement between the classifiers in the two views by the squared error, we use the Kullback-Leibler (KL) divergence, in one embodiment. In addition to having a natural interpretation in terms of probabilistic classifier output, this design allows us to naturally propose a boosting version of the co-classification approach.

Figure 4:
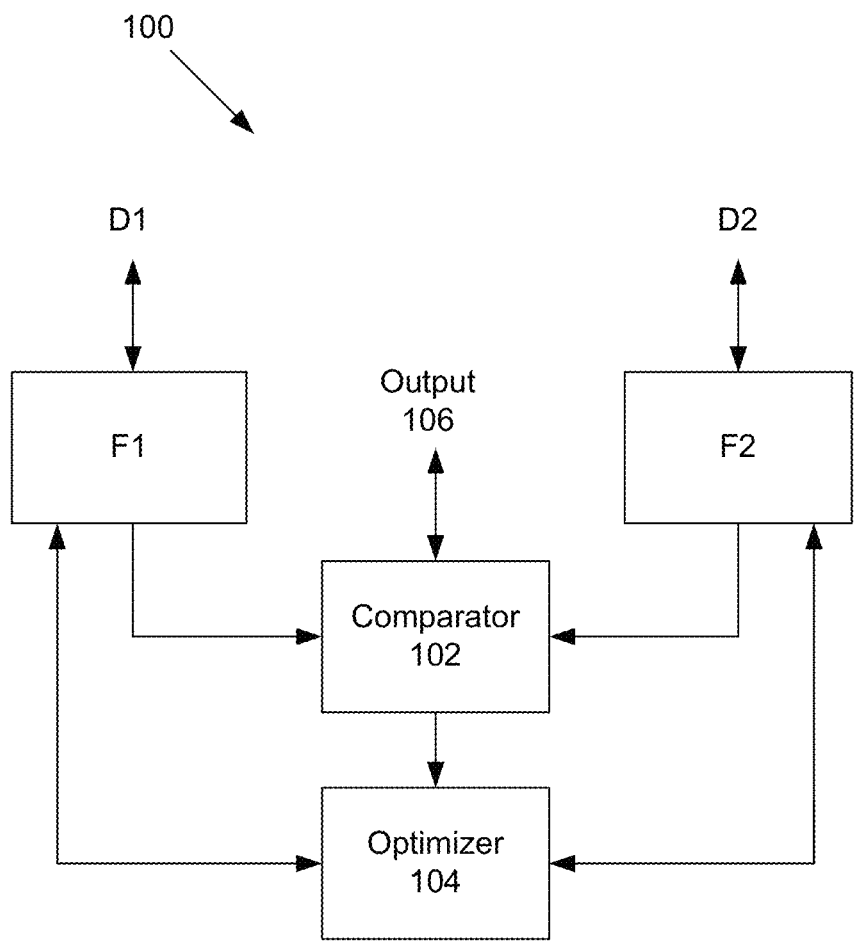
FIG. 4 is a block diagram of a classification system in accordance with an embodiment.

FIG. 4 is a block diagram of a classification system 100 in accordance with an embodiment. It should be noted that FIG. 4 is only an example which is not intended to suggest any limitation to the scope of use or functionality of the design.

As shown in FIG. 4, the classification system 100 includes two classifiers F1 and F2, for classifying subsets of documents D1 and D2, respectively. Subsets D1 and D2 include content-equivalent documents written in different languages. Classification results of F1 and F2 are received by a comparator 102 for measuring the training cost between the classifications of the two documents. An optimiser 104 receives the training cost value and compares the same to a local minimum. If the training cost between the classifications is greater than the minimum, the optimizer orders each of the classifiers to re-classify its designated subset taking into account the classification results of the other classifier. In an embodiment, the optimizer 104 adjusts the parameters of each classifier in order to reduce the training cost between the different classifications on the basis that documents have similar content must have substantially the same classifications. Once the training cost reaches the minimum, the classifications/classifiers will be sent to an output 106.

The output 106 may include parameters of the classifier(s), or the classification itself. The output 106 may be provided in many forms. For instance, the classification/classifier may be stored in memory, or may be displayed to a user as a graphical representation.

Figure 5:
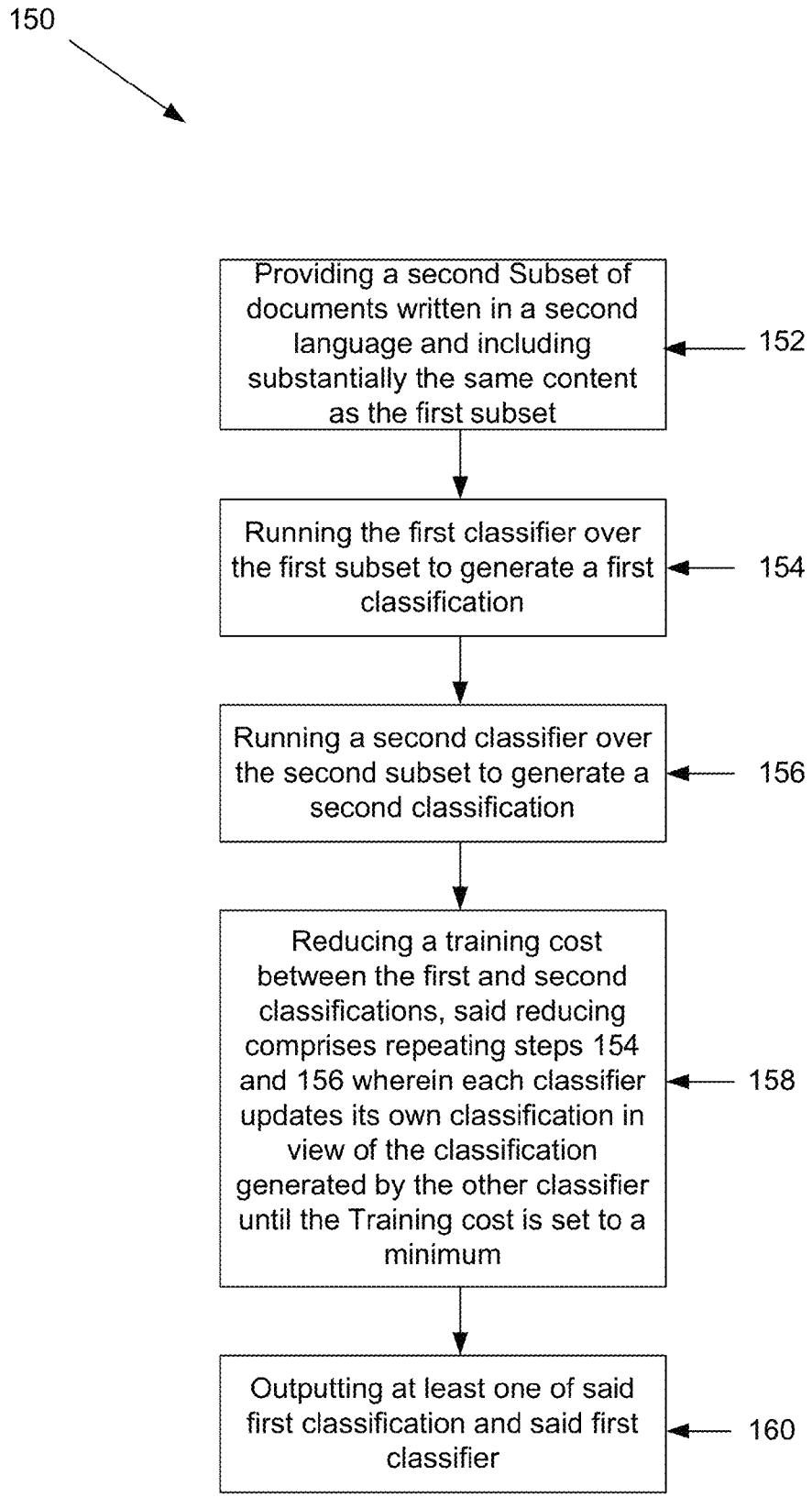
FIG. 5 is a flowchart of a method for enhancing the performance of a data classifier used for classifying a subset of documents written in a first language.

FIG. 5 is a flowchart of a method 150 for enhancing the performance of a data classifier used for classifying a first subset of documents written in a first language. At step 152 the method comprises providing a second subset of documents written in a second language and including substantially the same content as the first subset. Step 154 comprises running the first classifier over the first subset to generate a first classification. Step 156 comprises running a second classifier over the second subset to generate a second classification. Step 158 involves reducing a training cost between the first and second classifications. This may be done by repeating steps 154 and 156 wherein each classifier updates its own classification in view of the classification generated by the other classifier until the training cost is set to a minimum. Once the training cost is set to a minimum the first classification/classifier may be output at step 160.

Examples of algorithms and results of experiments will be described in greater detail herein below with reference to FIGS. 6 to 12.

The Model:

We consider two input spaces $X_1 \subset \mathbb{R}^d$ and $X_2 \subset \mathbb{R}^{p'}$, and an output space Y. We take $Y=\{-1, +1\}$ since we restrict our presentation to binary classification (we will address the extension to multiclass below). We assume that we have a set of m independently identically distributed labelled bilingual documents, $\{(x_i^{(1)}, x_i^{(2)}, y_i); i=1 \ldots m\}$, sampled from a fixed but unknown distribution P over $X_1 \times X_2 \times Y$. Input vector $x^{(1)}$ is the feature vector representing a document in one language, while $x_{(2)}$ is the feature vector representing the same document in another language, and y is the class label associated to the document. The two versions of the same document are typically translations of each other, although which direction the translation goes is not important for the present purpose.

Each language offers a different view on the same document, and we can form two monolingual training sets:

$$S_1 = \{(x_i^{(1)}, y_i); i=1 \ldots m\} \in (X_1 \times Y)^m; \text{ and}$$

$$S_2 = \{(x_i^{(2)}, y_i); i=1 \ldots m\} \in (X_2 \times Y)^m.$$

Note that for a given i, label $y_i$ is the same in both sets as both versions of the same document cover the same topic.

The problem we address is to construct two classifiers $f_1: X_1 \to Y$ and $f_2: X_2 \to Y$ from $S_1$ and $S_2$ so that a test document written in either language may be classified as accurately as possible.

Of course, it is possible to independently train $f_1$ on $S_1$ and $f_2$ on $S_2$. Our goal is therefore to propose an algorithm that results in classifiers that are more efficient than if they were trained separately on the monolingual data.

The Co-Classification Training Approach (Gradient-Based or cc-Logistic):

Our basic assumption is that a document and its translated version convey the same idea but in different ways. The difference is mostly due to the fact that the expression of an idea in each language makes use of different words. Our aim here is to take advantage of these two complementary views of the same information to train two different classifiers. In addition, as both views of a document have matching labels, we want the output of the classifiers working on either view to be in agreement. Our learning paradigm expresses this idea by relying on:

A monolingual misclassification cost for each classifier in each language/view; and A disagreement cost to constrain decisions to be similar in both languages.

More precisely, we look for functions $f_1$ and $f_2$ which not only achieve good performance on the training set in their respective language, but also agree with each other. In the following, we assume that classifiers $f_1$ and $f_2$ have corresponding underlying real-valued functions $h_1$ and $h_2$ (e.g. output of a Support Vector Machine (SVM) or probability for a generative model), and are obtained by thresholding using the sign function; $f_1 = \text{sign}(h_1)$ and $f_2 = \text{sign}(h_2)$.

Our framework relies on iteratively and alternately optimizing the classifier h from one view ($h=h_l$, $l \in \{1, 2\}$), while holding the classifier from the other view ($h^* = h_{3-l}$) fixed. This is done by minimizing a monolingual classification loss in that view, regularized by a divergence term which constrains the output of the trained classifier to be similar to that of the classifier previously learned in the other view.

Without loss of generality, let us now describe the stage where we optimize functions h from one view, while leaving the function from the other view, h*, fixed. Following the principle stated above, we seek the function h that minimizes the following local objective function:

$$\mathcal{L}(h, S, h^*, S^*, \lambda) = C(h, S) + \lambda d(h, S, h^*, S^*) \quad (1)$$

where C(h, S) is the (monolingual) cost of h on training set S, d(h, S, h*, S*) measures the divergence between the two classifiers on the same documents in both views and λ is a discount factor which modulates the influence of the disagreement cost on the optimization.

For the monolingual cost, we consider the standard misclassification error:

$$C(h, S) = \frac{1}{m} \sum_{i=1}^{m} [\![ y_i h(x_i) \leq 0 ]\!],$$

where $[\![\pi]\!]$ is equal to 1 if the predicate π it is true, and 0 otherwise. We usually replace it with an appropriate convex and differentiable proxy instead. Following standard practice in Machine Learning algorithms, we replace $[\![z \leq 0]\!]$ by the (convex and differentiable) upper bound a log(1+$e^{-z}$) with a=(log 2)$^{-1}$. The monolingual misclassification cost becomes:

$$C(h, S) = \frac{1}{m} \sum_{i=1}^{m} a \log(1 + \exp(-y_i h(x_i))),$$

Assuming that each classifier output may be turned into a posterior class probability, we measure the disagreement between the output distributions for each view using the Kullback-Leibler (KL) divergence. Using the sigmoid function σ(z)=(1+$e^{-z}$)$^{-1}$ to map the real-valued outputs of our functions h and h* into a probability, and assuming that the reference distribution is the output of the classifier learned on the other view, h*, the disagreement d(h, X, h*, S*) becomes:

$$d(h, S, h^*, S^*) = \frac{1}{m} \sum_{i=1}^{m} kl(\sigma(h^*(x_i^*)) \| \sigma(h(x_i))),$$

where for two binary probabilities p and q, the KL divergence is defined as:

$$kl(p \| q) = p \log\left(\frac{p}{q}\right) + (1-p) \log\left(\frac{1-p}{1-q}\right)$$

There are two reasons for choosing the KL divergence: First, it is the natural equivalent in the classification context of the $l_2$ norm used for regression in previous work on coregularization. Second, it allows the derivation of a boosting approach for minimizing the local objective function (Eq. 1 above), as further described below. That objective function now becomes:

$$\mathcal{L}(h, S, h^*, S^*, \lambda) = \quad (2)$$

$$\frac{1}{m} \sum_{i=1}^{m} \{a \log(1 + \exp(-y_i h(x_i))) + \lambda kl(\sigma(h^*(x_i^*)) \| \sigma(h(x_i)))\}.$$

In the case where h is a linear function, h(x)=⟨β, x⟩, it can be verified using calculus that the derivative of $\mathcal{L}$(h, S, h*, S*, λ) with respect to parameters β is:

$$\nabla_\beta \mathcal{L} = \frac{1}{m} \sum_{x \in S} x(ay(\sigma(yh(x)) - 1) + \lambda(\sigma(h(x)) - \sigma(h^*(x^*)))) \quad (3)$$

From the form of the derivative, it becomes apparent that the gradient is intimately related to the difference in classifier outputs, i.e., a large deviation (σ(h(x))−σ(h*(x*))) makes the gradient larger in either direction.

The gradient from (Eq. 3 above) can be plugged into any gradient-based minimization algorithm in order to obtain the linear weights which minimize $\mathcal{L}$(h, S, h*, S*, λ). In the next section, we present the optimization of the cost function (Eq. 1 above—or the local objective function) as the minimization of a Bregman distance and show how this problem can be solved by a boosting-like algorithm.

Once the classifier h has been learned, we reverse the roles of h and h* (as well as S and S*), and optimize $\mathcal{L}$(h*, S*, h, S, λ). This alternating optimization of partial cost functions bears similarity with the block-coordinate descent technique [D. Bertsekas, Nonlinear programming, 2nd ed. Belmont, Mass.: Athena Scientific. (1999)]. At each iteration, block coordinate descent splits variables into two subsets, the set of the active variables and the set of inactive ones, then minimizes the objective function along active dimensions while inactive variables are fixed at current values. In our case, the global objective function is:

$$\Delta(h_1, S_1, h_2, S_2, \lambda) = \underbrace{C(h_1, S_1) + C(h_2, S_2)}_{\text{misclassification}} + \lambda \underbrace{D(h_1, S_1, h_2, S_2)}_{\text{disagreement}} \quad (4)$$

where D($h_1$, $S_1$, $h_2$, $S_2$)=d($h_1$, $S_1$, $h_2$, $S_2$)+d($h_2$, $S_2$, $h_1$, $S_1$) is the symmetrised KL divergence, measuring the corpus-level disagreement.

Notice that the symmetrised KL divergence is a convex function, with respect to the actual distributions on which the divergence is measured, but not necessarily with respect to the parameters of these distributions. Notice that our algorithm is not exactly a block-coordinate descent technique: because of the asymmetry in the KL divergence used in (Eq. 2 above), we only minimize an approximate version of the global loss at each iteration.

Algorithm 1 as shown in FIG. 6, summarizes the overall training strategy, which is referred to as co-classification. Each monolingual classifier is first initialized on the monolingual cost alone, then we alternate optimization of either $h_1$ or $h_2$ while keeping the other function constant, until Δ($h_1$, $S_1$, $h_2$, $S_2$, λ) has reached a (possibly local) minimum. In this way: 1) we alternate between two views, and 2) the classifier that is learned in one view is affected by the output of the classifier learned in the other view, through the disagreement cost. Note however that each classifier does not change the labelling of examples, which is assumed to be fixed. The approach is referred to as a co-classification technique only because of its alternating iterative process of learning a classifier on the basis of the decisions of another classifier.

The Boosting-Based Approach to Training View-Specific Classifiers (Also Referred to as the Cc-Boost)

In this section, we present a framework for learning h with a boosting-like algorithm which optimizes Eq. (2) above.

The loss-minimization of:

$$\mathcal{R}(h, S, h^*, S^*, \lambda) = \frac{1}{m}\sum_{i=1}^{m}\{a\log(1+\exp(-y_i h(x_i))) + \lambda kl(\sigma(h^*(x_i^*))\|\sigma(h(x_i)))\} \quad (5)$$

is referred to as the minimization of a Bregman distance. This equivalence will allow us to employ a boosting-like parallel-update optimization algorithm to learn a linear classifier h: $x \mapsto <\beta, x>$ minimizing (Eq. 5 above).

A Bregman distance $B_F$ of a convex, continuously differentiable function F: $\Omega \to \mathbb{R}$ on a set of closed convex set $\Omega$ is defined as:

$$\forall\, p, q \in \Omega,\; B_F(p\|q) \stackrel{def}{=} F(p) - F(q) - \langle \nabla F(q), (p-q)\rangle$$

One optimization problem arising from a Bregman distance is to find a vector $p^* \in \Omega$, closest to a given vector $q_0 \in \Omega$ with respect to $B_F$, under the set of linear constraints $\{p \in \Omega | p^T M = \tilde{p}^T M\}$, where, $\tilde{p} \in \Omega$ is a specified vector and M is a n×d matrix, with n being the number of examples in the training set and d being the dimension of the problem. With regards to n, it has been deliberately set as such since in the equivalent rewriting of the minimization problem the latter is not exactly m.

Defining the Legendre transform as:

$$L_F(q, M\beta) \stackrel{def}{=} \underset{p \in \Omega}{\arg\min}(B_F(p\|q) + \langle M\beta, q\rangle),$$

the dual optimization problem can be stated as finding a vector q in the closure $\overline{Q}$ of the set $Q=\{L_F(q, M\beta)|\beta \in \mathbb{R}^p\}$, for which $B_F(\tilde{p}\|q)$ is the lowest, under the set of linear constraints $\{q \in \Omega | q^T M = \tilde{p}^T M\}$.

Both of the above optimization problems have a same unique solution. A single parallel-update optimization algorithm can be used to find a solution in the dual form. This algorithm is a procedure for solving problems which aim to minimize the exponential loss, like in Adaboost, or a log-likelihood loss, like in logistic regression. The equivalence of these two loss minimization problems can be shown in terms of Bregman distance optimization.

In order to apply Algorithm 2, which is shown in FIG. 7, we have to define a continuously differentiable function F such that by properly setting $\Omega$, $\tilde{p}$, $q_0$ and M, the Bregman distance $B_F(0\|L_F(q_0, M\beta))$ is equal to Eq. (5) above. We choose:

$$\forall\, p \in \Omega = [0,1]^n,\; F(p) = \sum_{i=1}^{n}\alpha_i(p_i + (1-p_i)\log(1-p_i)),$$

where $\alpha_i$ are non-negative real-valued weights associated to examples $x_i$. This yields:

$$\forall\, p, q \in \Omega \times \Omega, \quad (6)$$
$$B_F(p\|q) = \sum_{i=1}^{n}\alpha_i\left(p_i\log\left(\frac{p_i}{q_i}\right) + (1-p_i)\log\left(\frac{1-p_i}{1-q_i}\right)\right),\; \text{and}$$

$$\forall\, i,\; L_F(q, v)_i = \frac{q_i e^{-\frac{v_i}{\alpha_i}}}{1 - q_i + q_i e^{-\frac{v_i}{\alpha_i}}} \quad (7)$$

Using equations (6) and (7), and setting $$q_0 = \frac{1}{2}\mathbf{1},$$

the vector with all components set to ½, and M the matrix such that $\forall i, j,\; M_{ij} = \alpha_i y_i x_i^j$, we have:

$$B_F(0\|L_F(q_0, M\beta)) = \sum_{i=1}^{n}\alpha_i\log(1 + e^{-y_i\langle\beta, x_i\rangle}). \quad (8)$$

Note that All vectors $\forall i \in \{1, \ldots, n\}$, $\alpha_i y_i x_i$ should be normalized in order to respect the constraint $M \in [-1, 1]^{n \times d}$.

By developing Eq. (5) above, we get:

$$\mathcal{R}\cdot(h, S, h^*, S^*, \lambda) = \quad (9)$$
$$\frac{1}{m}\sum_{i=1}^{m}\{(a + y_i\lambda\sigma(h^*(x_i^*)) + \lambda[\![y_i = -1]\!])\log(1 + e^{-y_i h(x_i)}) +$$
$$\lambda([\![y_i = 1]\!] - y_i\sigma(h^*(x_i^*)))\log(1 + e^{y_i h(x_i)})\} + K,$$

where K does not depend on h.

In order to make Eq. (9) identical to Eq. (8) (up to a constant), we create, for each example $(x_i, y_i)$ a new example $(x_i, -y_i)$ (which makes n=2m), and set the weight as follows: for each example $(x_i, y_i)$, take $$\alpha_i = \frac{1}{m}(a + y_i\lambda\sigma(h^*(x_i^*)) + [\![y_i = -1]\!]\lambda),$$

while for its counterpart $(x_i, -y_i)$, we set $$\alpha_i = \frac{\lambda}{m}([\![y_i = 1]\!] - y_i\sigma(h^*(x_i^*)))$$

As a consequence, minimizing Eq. (5) is equivalent to minimizing $B_F(0\|q)$ over $q \in \overline{Q}$ where $Q = \{q \in [0,1]^{2m} | q_i = \sigma(y_i < \beta, x_i >),\; \beta \in \mathbb{R}^d\}$ This equivalence allows us to use Algorithm 2 shown in FIG. 7, for alternately optimizing each classifier within the general framework of Algorithm 1 shown in FIG. 6.

Experiments:

A number of experiments were conducted in order to illustrate the effectiveness of the above-described method. These results show how additional translated corpora can help to learn an efficient classifier under the present multiview framework.

Data Set

The experiments were conducted on a subset of the Reuters (RCV2) collection [Reuters: Reuters Corpus, vol. 2: Multilingual, 1996-08-20 to 1997-08-19 (2000)]. We used newswire articles written in four languages, French, German, Italian and Spanish and focused on six relatively populous classes: C15, CCAT, E21, ECAT, GCAT, M11 which are represented in all considered languages.

The table in FIG. 8 shows a distribution of the number of documents and size of the vocabulary of the Reuters RCV2 data used in our experiments, across languages and categories. For each language and each class, we sampled up to 5000 documents from RCV2.

Documents belonging to more than one of our 6 classes were assigned the label of their smallest class. This resulted in 12-30K documents per language (see the Table in FIG. 8), with between 728 and 5000 documents per category. A test split containing 75% of the documents (respecting class and language proportions) was reserved for testing. Each document from the corpus was translated to English using a state-of-the-art Statistical Machine Translation system developed at NRC [Nicola Ueffing, Michel Simard, Samuel Larkin, and J. Howard Johnson, NRC's PORTAGE system for WMT 2007, In ACL-2007 Second Workshop on SMT, pages 185-188 (2007)], in order to produce four bilingual, parallel corpora on which the experiments were ran. Each parallel corpus contains documents with two views: the original document and its translation.

For each document, we indexed the text appearing in the title (headline tag), and the body (body tags) of each article. As pre-processing, we lowercased, mapped digits to a single digit token, and removed tokens with no alphanumeric characters. We also filtered out function words using a stop-list, as well as tokens occurring in less than five documents.

Documents were then represented as a bag of words, using a TFIDF weighting scheme based on BM25 [Stephen E. Robertson and Steve Walker and Susan Jones and Micheline Hancock-Beaulieu and Mike Gafford, Okapi at TREC-3, Proc. 3rd Text Retrieval Conference (TREC), (1994)]. The final vocabulary size for each language is given in the last column of table 1 for the four source languages.

Evaluation Criteria

In order to evaluate the classification performance of the various methods, we used the F1 measure [C. van Rijsbergen, Information Retrieval, Butterworths, London, (1979)]. This measure combines Recall ($\Phi$) and Precision ($\Pi$) in the following way:

$$\Phi(h) = \frac{\sum_{i:y_i=+1} [\![h(x_i) > 0]\!]}{\sum_i [\![y_i = +1]\!]} \quad \Pi(h) = \frac{\sum_{i:y_i=+1} [\![h(x_i) > 0]\!]}{\sum_i [\![h(x_i) > 0]\!]}$$

$$F_1(h) = \frac{2 \times \Phi(h) \times \Pi(h)}{\Phi(h) + \Pi(h)}$$

Each reported performance value is the average over the 10 cross-validation folds.

Experimental Results

We first evaluated the impact of the co-regularization training on the monolingual classification performance. As a baseline, we trained logistic regression classifiers on the monolingual data only (source language documents on one hand, English translation on the other hand), i.e. each view independently. This actually corresponds to the initialization stage in Algorithm 1 of FIG. 6, and is indicated as logistic in the following. We also trained the linear classifiers using the two co-classification algorithms described in the previous section, i.e. Algorithm 1 of FIG. 6 using either the gradient-based or the boosting-based approach for alternately learning each classifier. We refer to these two approaches as cc-Logistic (for co-classification logistic) and cc-Boost (for co-classification boosting), respectively. For each language, we also compared the result to a Support Vector Machine (SVM) trained on each view independently. In our experiments, we used the SVMlight package [T. Joachims, Transductive inference for text classification using support vector machines, International Conference on Machine Learning, pp. 200-209, (1999)]. We used a linear kernel, and C was fixed to the default value of $$C^{-1} = \frac{1}{m} \sum_{i=1}^{m} \|x_i\|^2.$$

In a second stage, we compared our co-classification results to logistic and SVM models trained on the concatenated feature space obtained by joining the original and translated documents. This allows us to compare our results to an approach that uses information from both views.

All results presented below are averaged over 10 cross-validation (training/test) splits of the initial collection.

The table in FIG. 9 lists the F-measures of different learning algorithms on different classes and for all languages. The best result is in bold. The table in FIG. 9 also illustrates how the co-classification approach improves over the monolingual alternatives. It shows that both the cc-Logistic and the cc-Boost always improve over the baseline logistic, and the difference is almost always statistically significant. In FIG. 9, a $\downarrow$ symbol indicates that a prior art result is significantly worse than the best, according to a Wilcoxon rank sum test used at a p-value threshold of 0.01 [E. L. Lehmann, Nonparametric Statistical Methods Based on Ranks. McGraw-Hill, New York, (1975)]. The co-classification also usually improves over the single-view SVM. The SVM gets the best classification performance for 4 combinations of language and class, but the difference is never significant. On the other hand, both cc-Logistic and cc-Boost get several top classification results (21 and 23, respectively), and the improvement over the SVM is usually significant. These results show that the additional translated view is able to provide additional information, and possibly some disambiguation, which our co-classification is able to leverage. This therefore supports the conclusion that the co-classification approach we propose is able to simultaneously exploit the relevant information contained in both collections.

Another observation that can be made from these results is that both co-classification algorithms behave similarly on all classes and languages. The difference in F-score (also referred to as F-measures) is usually between 0.002 and 0.004. This is not surprising as both the gradient approach and the boosting approach are solving the same optimization problem. Their average performances are almost identical.

The above-detailed co-classification framework relies on a co-regularization, multiview learning approach which may be applied to various document classifiers. The experimental results presented suggest that this is an effective way to train monolingual classifiers while leveraging the availability of multilingual data with the same category structure. Our results also suggest that Machine Translation may be an effective way to provide useful additional views on which the co-classification framework may be applied.

One key feature as opposed to multiple kernel learning is that after having learned from multiple views, we obtain one classifier per view, and we can therefore classify examples for which only one view is available, without having to generate additional views (using MT for example).

Another interesting feature is that we can use any monolingual classifier as long as it can be trained with a regularized cost such as Eq. 1 above. This allows co-classification to be computationally efficient when the base classifiers are trained by gradient descent or boosting, as presented herein. Although the present description focuses on the use of a parallel corpus of documents and their translations, the present framework is extendable to the situation where a possibly much larger comparable corpus is available.

A comparable corpus contains documents in both language that, roughly speaking, "talk about the same thing". It is usually argued that comparable corpora are easier to obtain, and in larger quantities, than parallel corpora. Not only do documents need not be translations of each other, the number of source and translated documents may be quite different. Using such comparable corpora as an additional resource can further improve the classification accuracy demonstrated described herein.

In the context of the present co-classification framework, let us assume that we have an additional comparable corpus containing $m_1$ and $m_2$ documents, respectively. Let us consider each monolingual side of the corpus, $$T_1 = \{(x_i^{(1)}, y_i^{(1)}), i=m+1, \ldots m+m_1\}, \text{ and}$$

$$T_2 = \{(x_i^{(2)}, y_i^{(2)}), i=m+1, \ldots m+m_2\}$$

We can take this into account during training by adding these documents to the monolingual cost. For binary classification:

$$C(h_1, S_1, T_1) = \underbrace{\sum_{i=1}^{m} [\![y_i h_1(x_i^{(1)}) \leq 0]\!]}_{\text{parallel corpus cost}} + \underbrace{\sum_{i=m+1}^{m+m_1} [\![y_i^{(1)} h_1(x_i^{(1)}) \leq 0]\!]}_{\text{comparable corpus cost}} \quad (10)$$

and similarly for the monolingual cost on the English side.

In our above notation, documents $x_i^{(1)}$ and $x_i^{(2)}$ are translations of each other, and have an identical label $y_i^{(1)} = y_i^{(2)} = y_i$ for $i=1 \ldots m$, whereas for $i>m$, the documents are different and may have different labels $y_i^{(1)}$ and $y_i^{(2)}$.

The divergence between the classifiers remains unchanged in that case, and is still evaluated on the parallel corpus alone. The modification to Algorithm 1 of FIG. 6 is straightforward. In addition, note that we actually do not use the labels in the divergence term. The parallel corpus may therefore be entirely unlabeled. The monolingual costs may then use the labelled, comparable data, while the divergence use unlabeled parallel data from the same domain.

Two straightforward extensions of the co-classification framework are now described: the multiclass, multilabel setting, and the use of non-symmetric losses.

Although we have described our algorithms on binary classification, it is naturally possible to extend the framework to multiclass (both single- and multilabel). As the multiclass, multilabel situation may be seen as multiple binary classifications, described above, we will describe how the model can handle multiclass, single label classification. In that situation, $Y=\{1, \ldots K\}$. The monolingual cost $C(h, S)$ is then changed to reflect that. Assuming that the classifier h outputs a vector $h_k$, $k=1 \ldots K$, a multiclass extension of the misclassification cost used in Eq. 5 above, is:

$$C(h, S) = \sum_{i=1}^{m} [\![\operatorname*{argmax}_k h_k(x_i) \neq y_i]\!] \quad (11)$$

The general shape of the global objective function (Eq. 4 above) does not change, but the divergence between the classifier outputs is updated to handle multiple classes:

$$d(h^{(1)}(x_i), h^{(2)}(x_i)) = \sum_k (\sigma_k(h^{(1)}(x_i)) - \sigma_k(h^{(2)}(x_i))) \log\left(\frac{\sigma_k(h^{(1)}(x_i))}{\sigma_k(h^{(2)}(x_i))}\right) \quad (12)$$

where $\sigma(h(x))$ is a "softmax" which transforms the numeric scores $h(x)$ into output probabilities, e.g.:

$$\sigma_k(h(x)) = \exp(h_k(x))/\Sigma_j \exp(h_j(x)).$$

The previous extension leverages the general form of the global cost function (Eq. 4 above), which allows both classifiers to be trained on different sets of documents. Notice that this can be pushed further by actually using different costs for each view, or even train different classifiers on each view, as long as both can produce probabilities as output, so that we can compute the divergence. On languages that are linguistically very different, this may actually be relevant. (e.g. if one view is a language with a natural tokenization, a bag-of-word approach usually performs well). If the other language has no natural segmentation (e.g. Chinese), a classifier and cost working at the level of character sequences may be more appropriate.

A strategy for learning to classify documents from multilingual corpora has been described. The approach takes into account the disagreement of classifiers on the parallel part of a corpus, where for each document there exists a translated version in the other language. Training algorithms were derived for logistic regression and boosting (i.e. cc-Logistic and cc-Boosting), and show that the resulting categorizers outperform models trained independently on each language, as well as classifiers trained on the concatenation of both languages. Experiments were performed on four corpora extracted from Reuters RCV2, where each document was translated using a Statistical Machine Translation model. The results suggest that the herein proposed multi-view learning is a suitable framework for learning text categorizers from multilingual corpora. They also show that Machine Translation can help improve text categorization performance.

Now referring to FIG. 10, a schematic illustration of a document classification hierarchy built in accordance with an embodiment of the above described co-classification learning technique is illustrated. Monolingual corpora according to both French and English views are provided based on multilingual corpora of documents which may or may not have versions of each document in respective languages. A Machine translation is used to provide a translation of each document in order to have monolingual corpora in each language. Then, the training of the classifiers is performed based on the above-described technique (e.g. represented by the co-regularization constraint).

Figure 11:
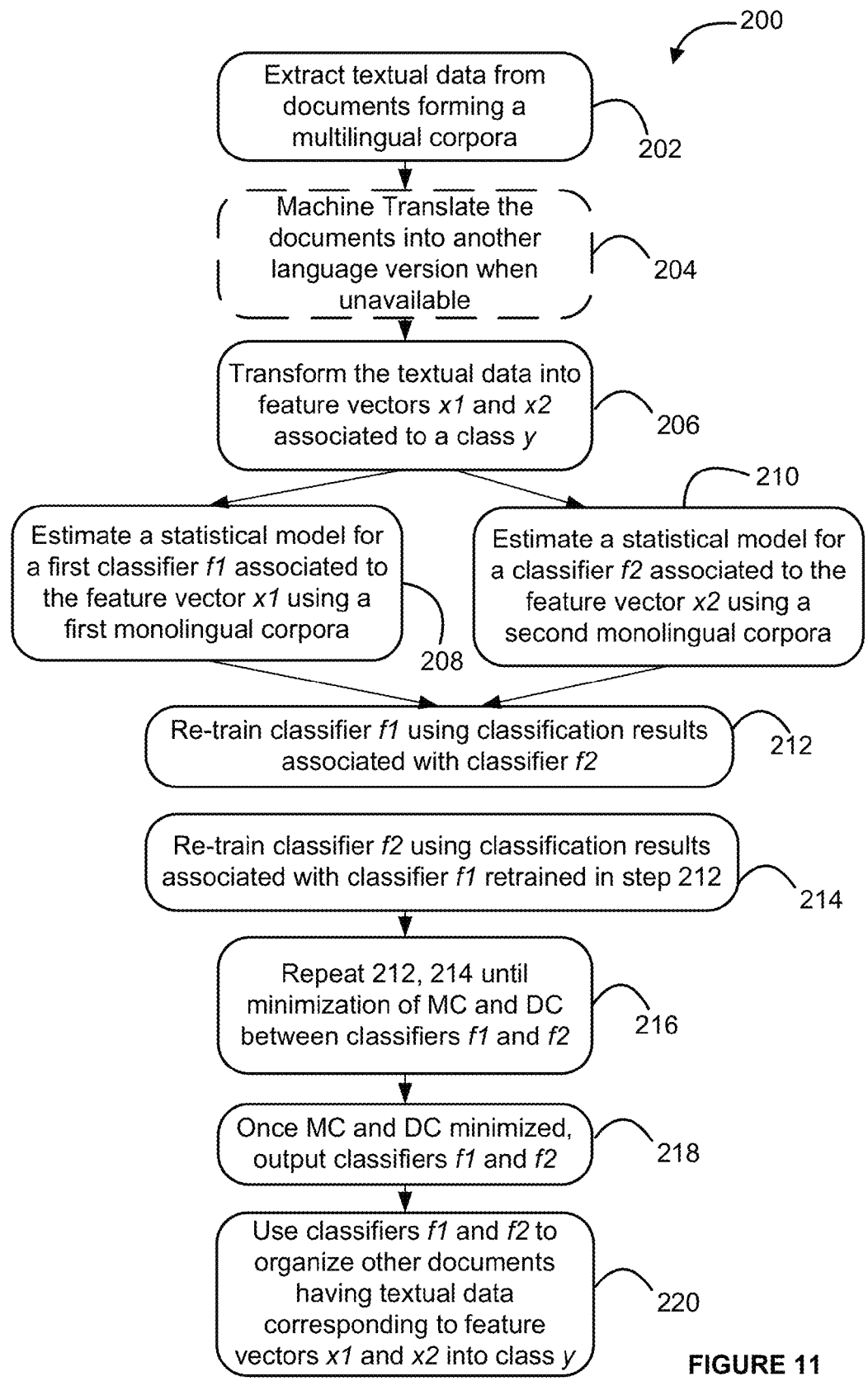
FIG. 11 is a flow chart summarizing an exemplary method 200 of generating classifiers to be used in categorizing or labeling documents, in accordance with an embodiment.
Figure 12:
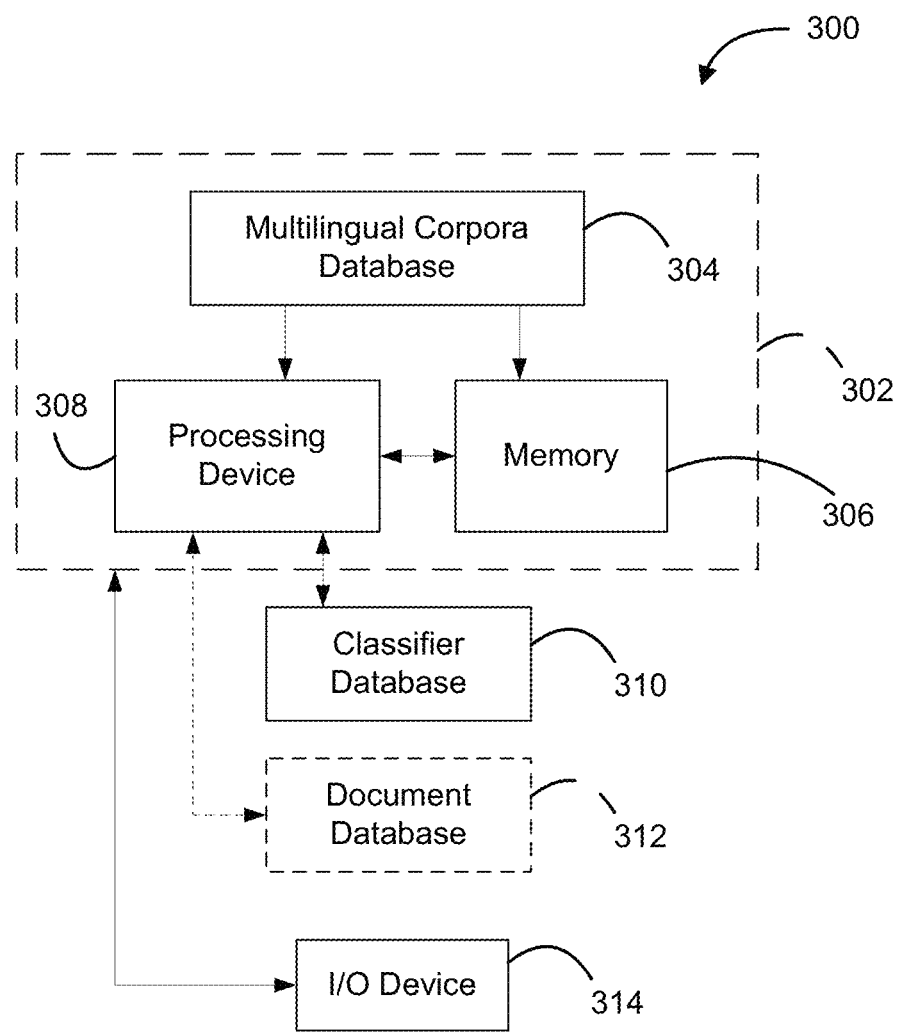
FIG. 12 is a schematic illustration of an exemplary system for generating classifiers to be used in categorizing or labeling documents, in accordance with an embodiment.

Now extending the above-described framework and strategies to an applicable generalized method, consider FIGS. 11 and 12, which respectively illustrate a examplary method and system usable to generate classifiers to be used in multilingual text categorization, in accordance with an embodiment.

FIG. 11 is a flow chart summarizing a method 200 of generating classifiers to be used in categorizing or labeling documents, in accordance with an embodiment.

In step 202, textual data is extracted from each one of a set of documents which form part of a multilingual corpora.

In step 204, the documents forming the multilingual corpora are machine translated when they are not available in all of the desired languages. This step is optional and may be performed before step 202.

In step 206, the textual data extracted in step 202 is transformed into either one of feature vectors x1 and x2, depending on the language version of the textual data. Each one of the feature vectors may be associated to a document classification y for categorizing different language versions of a same document.

In step 208, a statistical model of a first classifier f1 associated to the feature vector x1 is estimated using a first monolingual corpora (i.e. a subset of documents from the multilingual corpora which are in one language).

Similarly to step 208, in step 210, a statistical model of a classifier f2 associated to the feature vector x2 is estimated using a second monolingual corpora (i.e. another subset of documents from the multilingual corpora which are in another language).

Both step 208 and 210 can be performed simultaneously by training each classifier on respective monolingual corpora. These steps are akin to the initialization of the iterative Algorithms 1 and 2 described hereinabove with respect to FIGS. 1 and 2.

Still in reference to FIG. 11, in step 212, classifier f1 is re-trained on the first monolingual corpora based on classification results obtained from classifier f2. Step 212 generates a re-trained classifier f1'.

In step 214, classifier f2 is also re-trained on the second monolingual corpora based this time, on classification results obtained from the re-trained classifier f1' generated in step 212.

In step 216, steps 212 and 214 are iteratively repeated until a misclassification cost (MC) and a disagreement cost (DC) associated with re-trained classifiers f1' and f2' is minimized. More particularly, in step 216, step 212 is repeated until a disagreement between classification results from re-trained classifier f1' of a previous re-training iteration, and between classification results from re-trained classifier f2' of that iteration, is minimized. Similarly, step 214 is repeated until a disagreement between classification results from re-trained classifier f2' of a previous re-training iteration, and classification results from re-trained classifier f1' of that iteration, is minimized. The re-training is always performed on the same respective monolingual corpora.

In step 218, once MC and DC minimized, final classifiers f1' and f2' are outputted.

In step 220, final output classifiers f1' and f2' may be used to classify and organize any other document (or documents forming part of the corpora) which have textual data corresponding to feature vectors x1 and x2 into a document classification such as class y.

In the above method 200, step 212-216 make use of any one of the above-described gradient-based or boosting-based approaches for alternately learning each classifier f1 and f2. A discount factor may also be taken into consideration, which modulates the disagreement cost (DC). The method 200 may also incorporate any other aspect of the above-described classifier learning technique.

Now referring to FIG. 12, there is shown an embodiment of a system 300 for generating classifiers to be used in categorizing text documents.

The system 300 has a co-classification-based classifier generating unit 302 which has access to a multilingual corpora database 304. The unit 302 has a processing device 308 and a memory 306. Both the memory 306 and the processing device 308 are in operative communication to implement unit 302 such that the classifiers are trained according to a method illustrated as in FIG. 11 described hereinabove for example. More particularly, the method stores instructions for use by the processing device 308 which enable the processing device to perform a series of tasks until the classifiers are fully generated, trained and optimized. During the classifier iterative training, and/or once the classifiers are obtained, they can be stored in the classifier database 310.

The document database 312 is optional and may be used to store documents to be classified according to the classifiers obtained from the multilingual corpora database 304. Alternatively or additionally, the document database 312 may be used to store machine translated versions of documents which form part of the multilingual corpora database 304 in another language. Such translated documents are usable to form a monolingual corpora form the already available set of documents forming part of the multilingual corpora database 304.

While preferred embodiments have been described above and illustrated in the accompanying drawings, it will be evident to those skilled in the art that modifications may be made therein without departing from the essence of this disclosure. Such modifications are considered as possible variants comprised in the scope of the disclosure.

The invention claimed is:

1. A method for enhancing a performance of a first classifier implemented on a computing device used for classifying a first subset of documents written in a first language, the method comprising:
   a) receiving, at the computing device, a second subset of documents written in a second language different than the first language, said second subset including substantially the same content as the first subset;
   b) running the first classifier over the first subset to generate a first classification;
   c) running a second classifier implemented on the computing device over the second subset to generate a second classification;
   d) reducing a training cost between the first and second classifications, including repeating steps b) and c) wherein each classifier updates its own classification in view of the classification generated by the other classifier until the training cost is set to a minimum; the reducing comprising applying at least one of a gradient based algorithm for reducing the training cost between classifications, and an analytical algorithm for finding an approximate solution that reduces classification losses to reduce the training cost between classifications; and
   e) outputting at least one of said first classification and said first classifier.

2. The method of claim 1, wherein reducing further comprises updating one classification based on a probability associated with each class in the other classification.

3. The method of claim 2, wherein updating comprises reducing classification errors.

4. The method of claim 2, wherein the training cost includes a mis-classification cost associated with each classifier and a disagreement cost between the two classifiers.

5. The method of claim 2, wherein reducing comprises adjusting parameters of each classifier to reduce the training cost between classifications.

6. The method of claim 1, wherein, each classifier updates its own classification in view of the latest version of updated classification generated by the other classifier.

7. The method of claim 6, wherein repeating is performed at least partially in parallel by the first and second classifiers.

8. The method of claim 6, wherein repeating is performed in series wherein one classifier is fixed and the other classifier updates its own classification using the classification of the fixed classifier.

9. The method of claim 1, wherein providing the second subset comprises machine-translating said first subset into the second language.

10. The method of claim 1, wherein providing the second subset comprises providing a subset which is comparable to the first subset.

11. The method of claim 1, wherein providing the second subset comprises providing a subset which is a parallel translation of the first subset.

12. The method of claim 1, wherein the minimum is determined on the basis of a level of difference between the first and second languages.

13. A computer readable memory having recorded thereon non-transitory statements and instructions for execution by a processor for implementing the method of claim 1.

14. A method implemented on a computing device for generating classifiers from multilingual corpora, the method comprising:
   extracting, using the computing device, textual data from each one of a set of documents which form part of the multilingual corpora, the multilingual corpora comprising a first and a second subset of content-equivalent documents written in one of two respective languages;
   transforming the textual data into a respective one of feature vectors x1 and x2, each one of the feature vectors being associated to a document classification y for categorizing different language versions of a same document;
   generating, using the computing device, a first classifier f1 from the first subset, the first classifier f1 being associated to the feature vector x1;
   generating, using the computing device, a second classifier f2 from the second subset, the second classifier f2 being associated to the feature vector x2;
   re-training the first classifier f1 on the first subset based on classification results obtained from the second classifier f2, to obtain a re-trained first classifier f1';
   re-training the second classifier f2 on the second subset based on other classification results obtained from the re-trained first classifier f1', to obtain a retrained second classifier f2'; the re-training comprising applying at least one of a gradient based algorithm for reducing the training cost between classification results, and an analytical algorithm for finding an approximate solution that reduces classification losses to reduce the training cost between classification results;
   repeating the steps of re-training until a training cost between the retrained first and second classifiers is minimized, thereby producing final first and second re-trained classifiers; and
   outputting at least one of the final first re-trained classifier and the final second re-trained classifier.

15. A computer readable memory having recorded thereon non-transitory statements and instructions for execution by a processor for implementing the method of claim 14.

16. The method of claim 14, wherein the training cost includes a mis-classification cost associated with each classifier and a disagreement cost between the two classifiers.

17. A system for classifying content-equivalent documents written in different languages, said system comprising
   a first classifier for classifying a first set of documents written in a first language to generate a first classification;
   a second classifier for classifying a second set of documents written in a second language different the first language to generate a second classification;
   a comparator operatively connected to outputs of said first and second classifiers for detecting a training cost between said first and second classifications; and
   an optimizer for adjusting parameters of said first and second classifiers based on the second and first classifications respectively, when the training cost is higher than a minimum, wherein adjusting the parameters includes applying at least one of a gradient based algorithm for reducing the training cost between classifications, and an analytical algorithm for finding an approximate solution that reduces classification losses to reduce the training cost between classifications;
wherein the optimizer orders the first and second classifiers to re-classify the first and second sets of documents until the training cost reaches the minimum.

18. A system according to claim 17, wherein each classifier updates its own classification based on a probability associated with each class in the other classification.

19. A system according to claim 17, wherein one of the first and second sets is a machine-translation of the other.

20. A system according to claim 19, wherein the system comprises a translator for translating one of the sets to a different language.

21. A system according to claim 17, wherein the minimum is determined on the basis of a level of difference between the first and second languages.

22. The system of claim 17, wherein the training cost includes a mis-classification cost associated with each classifier and a disagreement cost between the two classifiers.

23. A method for enhancing a performance of a first classifier implemented on a computing device used for classifying a first subset of documents written in a first language, the method comprising:
   a) receiving, at the computing device, a second subset of documents written in a second language different than the first language, said second subset including substantially the same content as the first subset;
   b) running the first classifier over the first subset to generate a first classification;
   c) running a second classifier over the second subset to generate a second classification;
   d) reducing a training cost between the first and second classifications, said reducing comprises repeating steps b) and c) wherein each classifier updates its own classification in view of the classification generated by the other classifier until the training cost is set to a minimum; the repeating being performed in series wherein one classifier is fixed and the other classifier updates its own classification using the classification of the fixed classifier; and
   e) outputting at least one of said first classification and said first classifier.

24. The method of claim 23, wherein the training cost includes a mis-classification cost associated with each classifier and a disagreement cost between the two classifiers.

25. A system for classifying content-equivalent documents written in different languages, said system comprising
- a first classifier for classifying a first set of documents written in a first language to generate a first classification;
- a second classifier for classifying a second set of documents written in a second language different the first language to generate a second classification;
- a comparator operatively connected to outputs of said first and second classifiers for detecting a training cost between said first and second classifications; and
- an optimizer for adjusting parameters of said first and second classifiers based on the second and first classifications respectively, when the training cost is higher than a minimum;

wherein the optimizer orders the first and second classifiers to re-classify the first and second sets of documents until the training cost reaches the minimum, wherein the re-classification is performed in series wherein one classifier is fixed and the other classifier updates its own classification using the classification of the fixed classifier.

26. The system of claim 25, wherein the training cost includes a mis-classification cost associated with each classifier and a disagreement cost between the two classifiers.

* * * * *

UNITED STATES PATENT AND TRADEMARK OFFICE
CERTIFICATE OF CORRECTION

PATENT NO. : 8,438,009 B2
APPLICATION NO. : 12/909389
DATED : May 7, 2013
INVENTOR(S) : Massih Amini and Cyril Goutte Page 1 of 1

It is certified that error appears in the above-identified patent and that said Letters Patent is hereby corrected as shown below:

On title page:
item (75), line inventors, after "Massih Amini" replace "Gatineou" with "Gatineau"

item (75), line inventors, after "Cyril Goutte" replace "Toronto" with "Ottawa"

item (74), line Attorney, Agent or Firm, replace "Benoî & Côté" with "Benoît & Coté"

Signed and Sealed this
First Day of July, 2014

Michelle K. Lee
*Deputy Director of the United States Patent and Trademark Office*